(12) United States Patent
Thompson (10) Patent No.: US 8,281,546 B2
(45) Date of Patent: Oct. 9, 2012

(54) SLIP FORMED CONCRETE WIND TURBINE TOWER

(76) Inventor: Bradley D. Thompson, Winnipeg (CA)

( * ) Notice: Subject to any disclaimer, the term of this patent is extended or adjusted under 35 U.S.C. 154(b) by 428 days.

(21) Appl. No.: 12/752,479

(22) Filed: Apr. 1, 2010

(65) Prior Publication Data

US 2010/0281819 A1    Nov. 11, 2010

Related U.S. Application Data (60) Provisional application No. 61/175,662, filed on May 5, 2009.

(51) Int. Cl.
*E04H 12/34*     (2006.01)
*F03D 11/04*     (2006.01)

(52) U.S. Cl. ............ 52/745.17; 52/651.05; 52/745.2; 29/897.33; 29/889; 425/65; 249/20; 290/55; 264/33; 416/DIG. 6

(58) Field of Classification Search ........... 52/745.17, 52/651.05; 264/33; 29/897.33, 889; 416/142, 416/146 R, 244 R, DIG. 6; 254/4 R; 425/63–65; 249/20; 290/55
See application file for complete search history.

(56) References Cited

U.S. PATENT DOCUMENTS

| | | | | |
|---|---|---|---|---|
| 1,126,323 A * | 1/1915 | Webb et al. | | 425/64 |
| 1,160,131 A * | 11/1915 | Binger | | 425/64 |
| 1,376,911 A * | 5/1921 | Abram | | 425/64 |
| 3,252,199 A * | 5/1966 | Bossner | | 425/65 |
| 3,509,606 A * | 5/1970 | Fisher | | 425/63 |
| 3,516,129 A * | 6/1970 | Yoder | | 425/64 |
| 3,901,472 A * | 8/1975 | Ahlgren | | 249/20 |
| 4,016,228 A * | 4/1977 | Schmidt | | 264/33 |
| 4,060,358 A * | 11/1977 | Fougea | | 425/65 |
| 4,403,460 A * | 9/1983 | Hills | | 52/745.01 |
| 4,530,648 A * | 7/1985 | Phillips | | 425/65 |
| 4,562,989 A * | 1/1986 | Scheller | | 249/17 |
| 4,804,320 A * | 2/1989 | Sommer et al. | | 425/65 |
| 5,241,797 A * | 9/1993 | Cliff | | 52/192 |
| 6,522,025 B2 * | 2/2003 | Willis et al. | | 290/55 |
| 6,868,646 B1 * | 3/2005 | Perina | | 52/745.17 |
| 7,927,445 B2 * | 4/2011 | Zheng et al. | | 156/187 |
| 8,011,098 B2 * | 9/2011 | Vorhies et al. | | 29/889.2 |
| 8,069,634 B2 * | 12/2011 | Livingston et al. | | 52/745.17 |
| 2003/0033772 A1* | 2/2003 | Russell | | 52/292 |
| 2003/0183594 A1* | 10/2003 | Torres Martinez | | 212/196 |

(Continued)

FOREIGN PATENT DOCUMENTS

DE      39 35 076 A1 *   4/1991

(Continued)

*Primary Examiner* — Robert Canfield
(74) *Attorney, Agent, or Firm* — Ryan W. Dupuis; Kyle R. Satterthwaite; Ade & Company Inc (57) ABSTRACT

A wind turbine is formed of a concrete tower which is erected by slip forming. A primary lifting device is erected onto the tower by being lifted together with the slip form and being subsequently transferred onto the tower from the slip form after the tower has been formed. The nacelle, generator, and rotor of the turbine are then lifted onto the tower using the primary lifting device. A secondary lifting device supported on the tower is used to lower the primary lifting device to the ground after the nacelle, generator and rotor are assembled. The height of the tower is therefore not limited by the availability of suitable cranes so that a greater height of tower can be erected to take advantage of winds at greater elevation.

20 Claims, 10 Drawing Sheets

| U.S. PATENT DOCUMENTS | | | |
|---|---|---|---|
| 2008/0040983 A1 | 2/2008 | Fernandez Gomez et al. | |
| 2008/0313972 A1* | 12/2008 | Grob et al. | 52/40 |
| 2009/0031639 A1 | 2/2009 | Cortina | |
| 2010/0170188 A1* | 7/2010 | Zilmer et al. | 52/745.17 |
| 2012/0131880 A1* | 5/2012 | Delago et al. | 52/745.18 |

| FOREIGN PATENT DOCUMENTS | | | |
|---|---|---|---|
| EP | 1 857 670 A1 | * | 5/2006 |
| WO | 2007/092106 A2 | * | 8/2007 |

\* cited by examiner

SLIP FORMED CONCRETE WIND TURBINE TOWER

This application claims the benefit under 35 U.S.C. 119(e) of U.S. provisional application Ser. No. 61/175,662, filed May 5, 2009.

FIELD OF THE INVENTION

The present invention relates a wind turbine comprising a concrete tower supporting a nacelle, generator and rotor thereon, and more particular the present invention relates to a method of erecting the wind turbine by forming the concrete tower using a slip form which also supports a gantry crane thereon for lifting the nacelle, the generator and the rotor onto the concrete tower.

BACKGROUND

Wind turbines typically comprise a tall tower supporting a nacelle, a generator and a rotor comprising a central hub and radially extending blades thereon. It is generally known that it is desirable to erect the tower as tall as possible to take advantage to high wind speeds however it is difficult to cost effectively erect towers of optimal heights in many locations, in part due to the limited availability of suitable cranes commonly used for lifting the rotor and nacelle onto the tower. The availability of suitable cranes thus limits the height of the turbine which in turn limits the efficiency of the turbine. Also due to the practical limitation of steel tube towers the height of the tower is also limited.

U.S. patent application publications 2009/0031639 by Cortina and 2008/0040983 by Fernandez Gomez et al. disclose examples of wind turbines in which the towers are formed of modular sections to simplify the erection thereof. As described however cranes are still required for lifting the various components into position such that the overall height of the tower is still limited. Furthermore the modular construction requires a considerable number of parts to be shipped to the construction site while also requiring specialised labour to assemble the complex structure thereof.

SUMMARY OF THE INVENTION

According to one aspect of the invention there is provided a method of erecting a wind turbine comprising a concrete tower supporting a nacelle, a generator and a rotor thereon, the method comprising:

forming a foundation;
assembling a slip form comprising an inner form assembly and an outer form assembly defining an annular casting space therebetween having an open bottom end;
supporting the slip form on the foundation;
supporting a gantry comprising a primary lifting device above the slip form;
pouring concrete into the casting space in the slip form to define a first wall portion of the concrete tower;
raising the slip form together with the gantry relative to the first wall portion;
pouring concrete into the casting space in the slip form to define a plurality of subsequent wall portions;
raising the slip form together with the gantry relative to a previously formed one of the wall portions after concrete is poured into each of the plurality of subsequent wall portions until the concrete tower is formed;
transferring the gantry from the slip form to the concrete tower;
lifting the nacelle onto the concrete tower using the primary lifting device;
lifting the generator onto the concrete tower using the primary lifting device and attaching the generator to the nacelle;
lifting the rotor onto the concrete tower using the primary lifting device and attaching the rotor to the generator;
supporting a secondary lifting device on the concrete tower;
lowering the gantry and the primary lifting device to the foundation using the secondary lifting device.

By providing a slip form for forming the concrete tower, the tower can be manufactured in an efficient manner while further permitting a suitable lifting device to be carried to the top of the tower on the slip form as the tower is formed. The height of the tower is therefore not limited by the availability of suitable cranes so that a greater height of tower can be erected as the lifting device carried on the slip form can be used to lift the rotor, generator and nacelle into place instead of using a crane. Accordingly winds at greater elevation can be taken advantage of to improve the efficiency of the turbine. Furthermore the slip form technique for forming the tower permits the tower to be manufactured of relatively low cost components in a simple uniform structure of considerable strength.

The method preferably includes lifting a transition member onto the concrete tower using the primary lifting device and supporting the nacelle on the transition member.

The transition member is preferably supported on a top end of the concrete tower above an anchoring position of the gantry on the concrete tower.

The transition member may comprise a frustoconical member which is reduced in diameter from an annular bottom end supported on a top end of the concrete tower to a top end supporting the nacelle thereon.

When an annular flange is provided about a top end of the transition member, preferably the nacelle is supported on the annular flange for rotation relative to the concrete tower about a vertical pivot axis.

The method may further comprise lowering the inner form and the outer form relative to the concrete tower prior to lifting the transition member onto the concrete tower.

Preferably a plurality of tendons are tensioned between the foundation and the transition member such that the concrete tower is under compression prior to lifting the nacelle and the rotor onto the concrete tower.

When the transition member comprises a perimeter wall surrounding a hollow interior, the method may include providing an access opening in the perimeter wall, anchoring the secondary lifting device within the hollow interior of the transition member, and lowering the gantry and the primary lifting device using the secondary lifting device by communicating the secondary lifting device through the access opening in the transition member.

The gantry may comprise a pair of upright frame assemblies on opposing sides of the concrete tower so as to receive the nacelle therebetween and an overhead frame assembly spanning between the pair of upright frame assemblies spaced above the concrete tower so as to receive the nacelle therebelow in which the primary lifting device is suspended from the overhead frame assembly.

When the overhead frame assembly is oriented to span in a lateral direction between the two upright frame assemblies and a main beam is provided on the overhead frame assembly which spans generally horizontally in a longitudinal direction perpendicular to the lateral direction, the primary lifting device is preferably movable in the longitudinal direction along the main beam of the overhead frame assembly.

Each upright frame assembly is preferably anchored externally on the concrete tower at a bottom end of the upright frame assembly.

The frame assemblies of the gantry are preferably disassembled prior to lowering the gantry to the foundation.

The main beam and the overhead frame assembly may be lowered to the foundation prior to disassembling the upright frame assemblies.

An inner deck may be supported to span generally horizontally across the inner form assembly.

The inner deck is preferably transferred from the slip form to the concrete tower and the slip form is lowered to the foundation after the inner deck is supported on the concrete tower.

The inner deck may be partially lowered prior to transferring the inner deck onto the concrete tower.

An outer deck may also be supported to span generally horizontally about the outer form assembly.

The outer deck is also preferably transferred from the slip form to the concrete tower and the slip form is lowered to the foundation after the outer deck is supported on the concrete tower.

The outer deck may be lowered to the foundation using the secondary lifting device after the nacelle and the rotor are supported on the concrete tower.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a wind turbine generally indicated by reference numeral 10. The turbine 10 comprises a tower 12 supported on a suitable foundation 14 on the ground. The foundation comprises any suitable base in the form of a pad or piles in the ground and the like. The tower 12 is erected to extend upwardly from the foundation to a top end of the tower by using a slip form 16 as described and illustrated herein. The resulting tower is generally circular in cross section and is tubular in shape defining a hollow interior surrounded by a perimeter wall having an inner surface and an outer surface which are generally cylindrical in shape.

Figure 1:
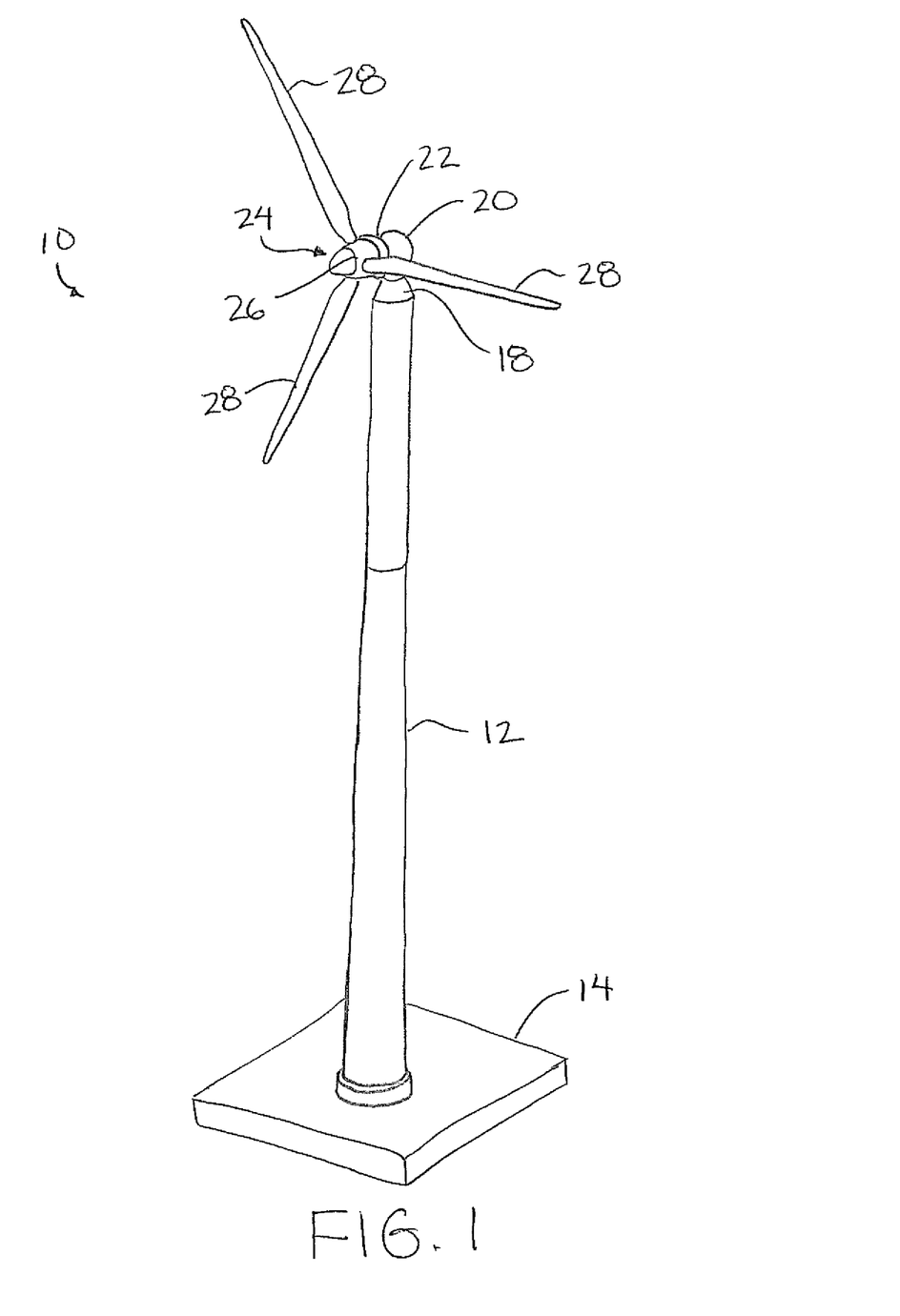
FIG. 1 is a side elevational view of the wind turbine.

A transition member 18 is supported on the top end of the tower and serves to support a nacelle 20 thereon such that the nacelle is pivotal about a vertical pivot axis relative to the tower. A generator 22 and rotor 24 are supported on the nacelle for rotation about a horizontal turbine axis. The rotor comprises a central hub 26 and a plurality of blades 28 extending radially outward from the hub for rotation with the hub about the horizontal axis of rotation thereof. Each of the blades is pivotal about a respective longitudinal axis thereof extending radially outward from the hub for controllably adjusting the blade pitch.

The erection of the turbine tower typically involves initially forming the foundation followed by the construction of the concrete tower thereon using the slip form 16. The nacelle, the generator and the rotor are lifted onto the completed concrete tower individually as preassembled modules.

Figure 2:
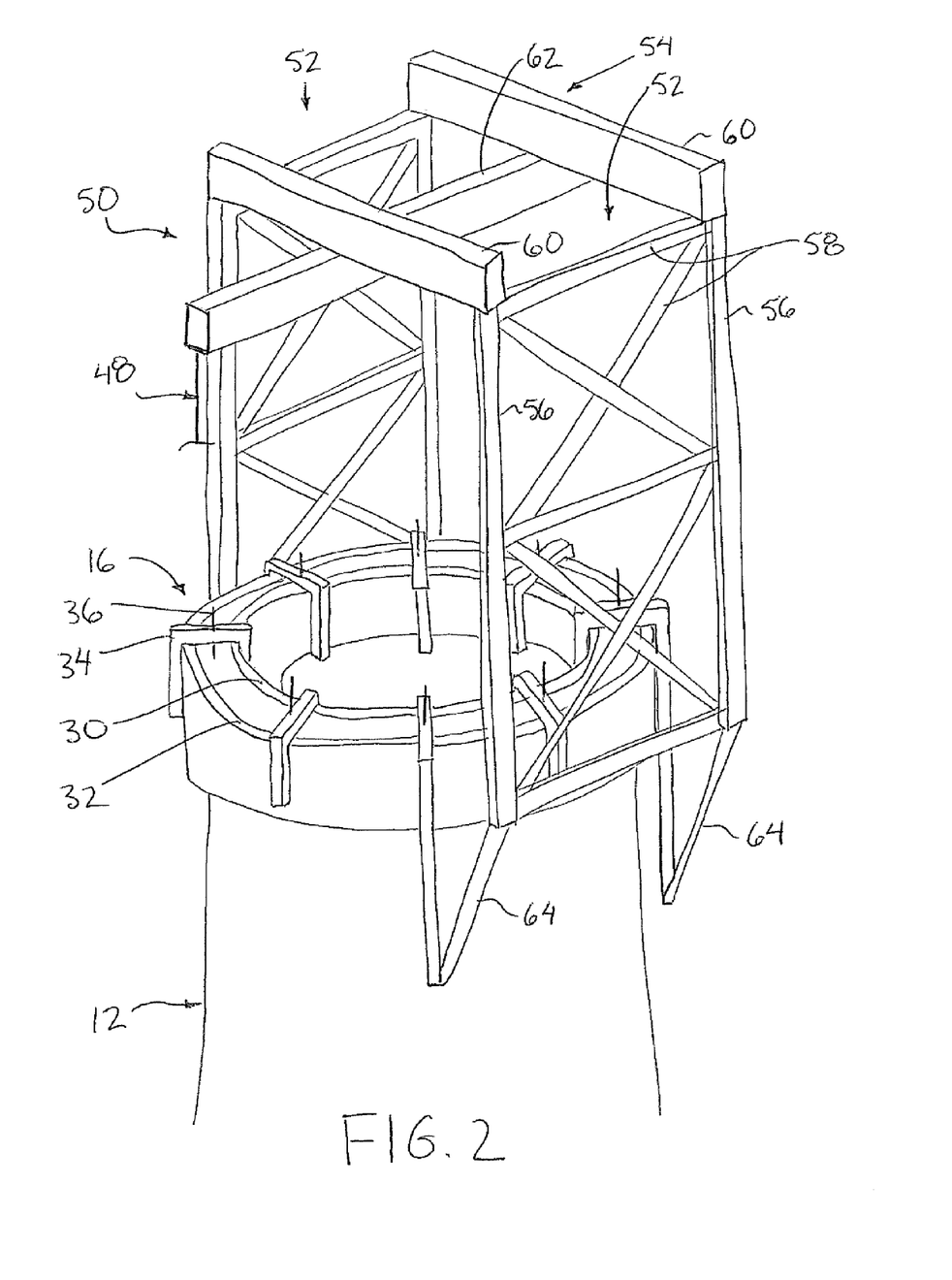
FIG. 2 is a perspective view of the slip form shown supported on a partially erected tower with the gantry supported on the slip form.
Figure 3:
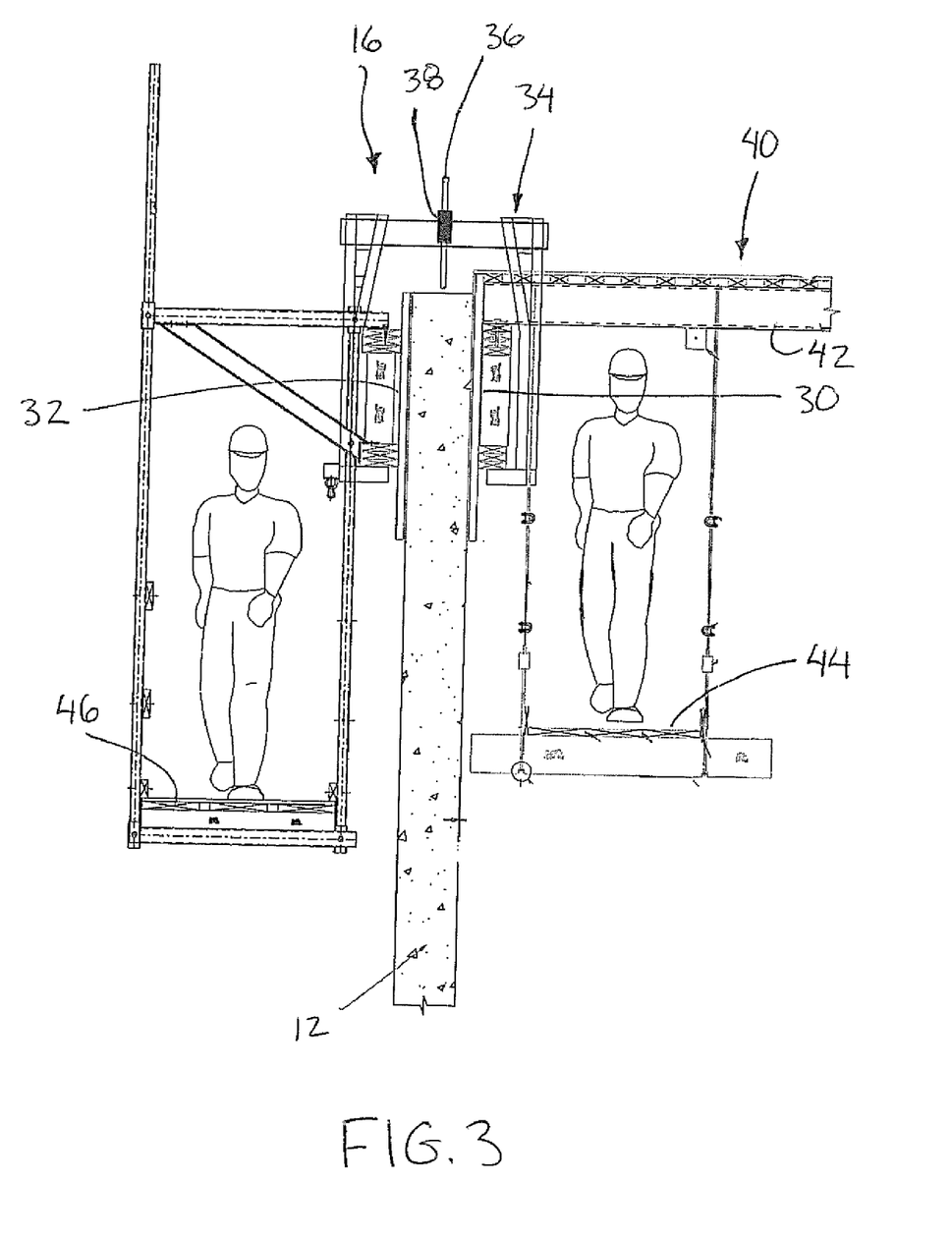
FIG. 3 is a section elevational view of a portion of the tower being formed by the slip form.

The slip form 16 generally comprises an inner form assembly 30 which forms and defines the resulting inner surface of the perimeter wall of the tower. The inner form assembly 30 comprises a plurality of form sections in the form of panels mounted adjacent one another to form a generally annular wall with a smooth continuous outer surface which forms the inner surface of the tower wall. Suitable framework joins the inner sides of the panels to suspend the inner form assembly from the slip form structure. Some of the panels are removable to vary the overall circumference of the inner form assembly to reduce the overall diameter of the resulting tower being formed towards the top end of the tower.

The slip form further comprises an outer form assembly 32 which defines the outer surface of the concrete tower being formed. The outer form assembly similarly comprises a plurality of sections mounted adjacent one another about the circumference of the slip form in which the sections comprise individual panels which can be removed to vary the overall diameter of the form. The sections of the outer form assembly 32 assemble to form a smooth and continuous inner surface that forms the outer surface of the perimeter wall of the tower. A suitable framework joins the outer sides of the sections of the outer form assembly to suspend the outer form assembly from the slip form structure.

The structure of the slip form generally comprises a plurality of yoke members 34 joined between the inner form assembly and the outer form assembly to support the inner and outer form assemblies spaced apart from another such that the annular space therebetween defines a casting space receiving concrete therein to form the perimeter wall of the tower. The casting space is open at a top end for receiving concrete poured therein and is also open at a bottom end thereof where the cured concrete is effectively extruded out of the form as the slip form is raised during the formation of the tower.

Each yoke member is generally U-shaped, comprising two opposing side portions extending downwardly overtop of the frame work of the respective inner and outer form assemblies and a central portion spanning between the two central portions at a location spaced above the inner and outer form assemblies. The yoke members are provided at a plurality of evenly circumferentially spaced positions about the slip form. Each of the yoke members is arranged to be aligned with a respective vertical post 36 cast into the concrete perimeter wall of the tower. The vertical posts are centrally located between the inner and outer surfaces of the perimeter wall of the tower at circumferentially spaced positions thereabout such that the yoke members are suspended on the vertical posts at the central portion of the yoke members to suspend the inner and outer form assemblies therebelow. A suitable jacking mechanism 38 jacks each yoke member relative to the respective vertical post 36 for lifting the slip form upwardly along the posts casts into the perimeter wall of the tower being formed.

An inner deck 40 is provided to span an interior of the hollow concrete tower by spanning the interior of the inner form assembly of the slip form. The inner deck 40 comprises a plurality of beams 42 supported to span generally horizontally between opposing ones of the yoke members of the slip form. Typically a plurality of parallel beams 42 are arranged to support decking spanning horizontally thereabove to provide a working surface which follows the slip form during the erection of the tower. The inner deck 40 may further comprise an annular work platform 44 or scaffold adjacent the inner surface of the tower wall about the perimeter thereof. The horizontal work platform 44 is suspended from the inner deck on the yoke members of the slip form during the formation of the concrete tower.

An exterior deck in the form an annular platform 46 or scaffold can also be supported on the slip form to extend fully about the perimeter of the tower wall at the exterior side thereof. The exterior platform 46 is arranged to be suspended from the outer form assembly at the outer side of yoke during formation of the concrete tower.

The formation of the tower begins by first assembling the forms on the foundation with the vertical posts 36 being arranged at circumferentially spaced positions about the form so that concrete can be poured into the forms to form a first wall portion at the base of the foundation. As the first wall portion cures, the slip form can be jacked upwardly along the posts with more concrete being poured into the top end of the slip form to form a subsequent wall portion. The slip form is continued to be moved upwardly along the posts so that concrete can be again poured into the casting space of the slip form to form subsequent wall portions as each previous wall portion cures. The posts 36 are assembled in sections above the slip form as the slip form is displaced upwardly thereaolong. At various stages of upward advancement of the slip form, sections of the inner and outer form assemblies are removed to reduce the diameter of the concrete wall being form.

Figure 4:
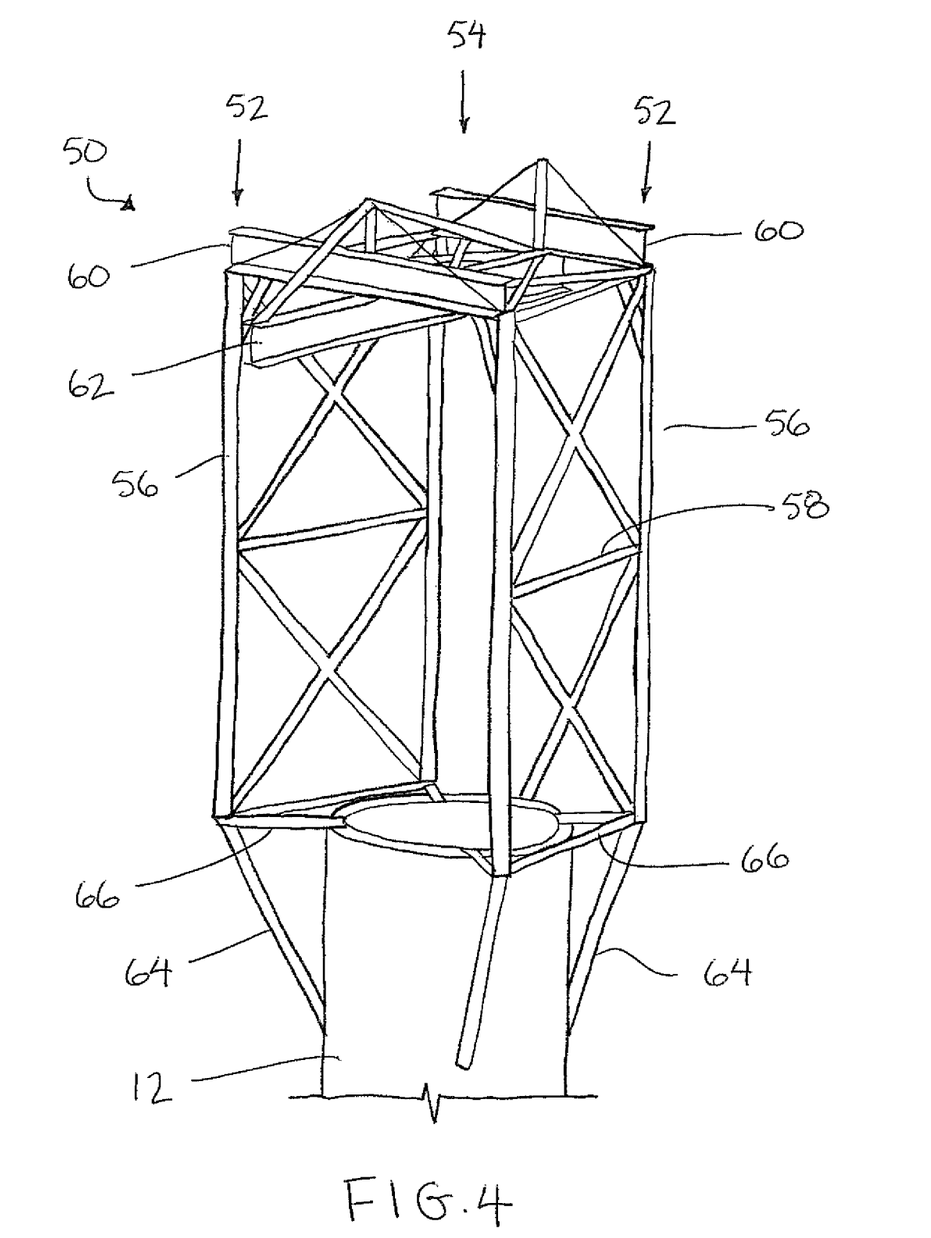
FIG. 4 is a perspective view of the gantry shown supported on the top end of the erected tower.
Figure 5:
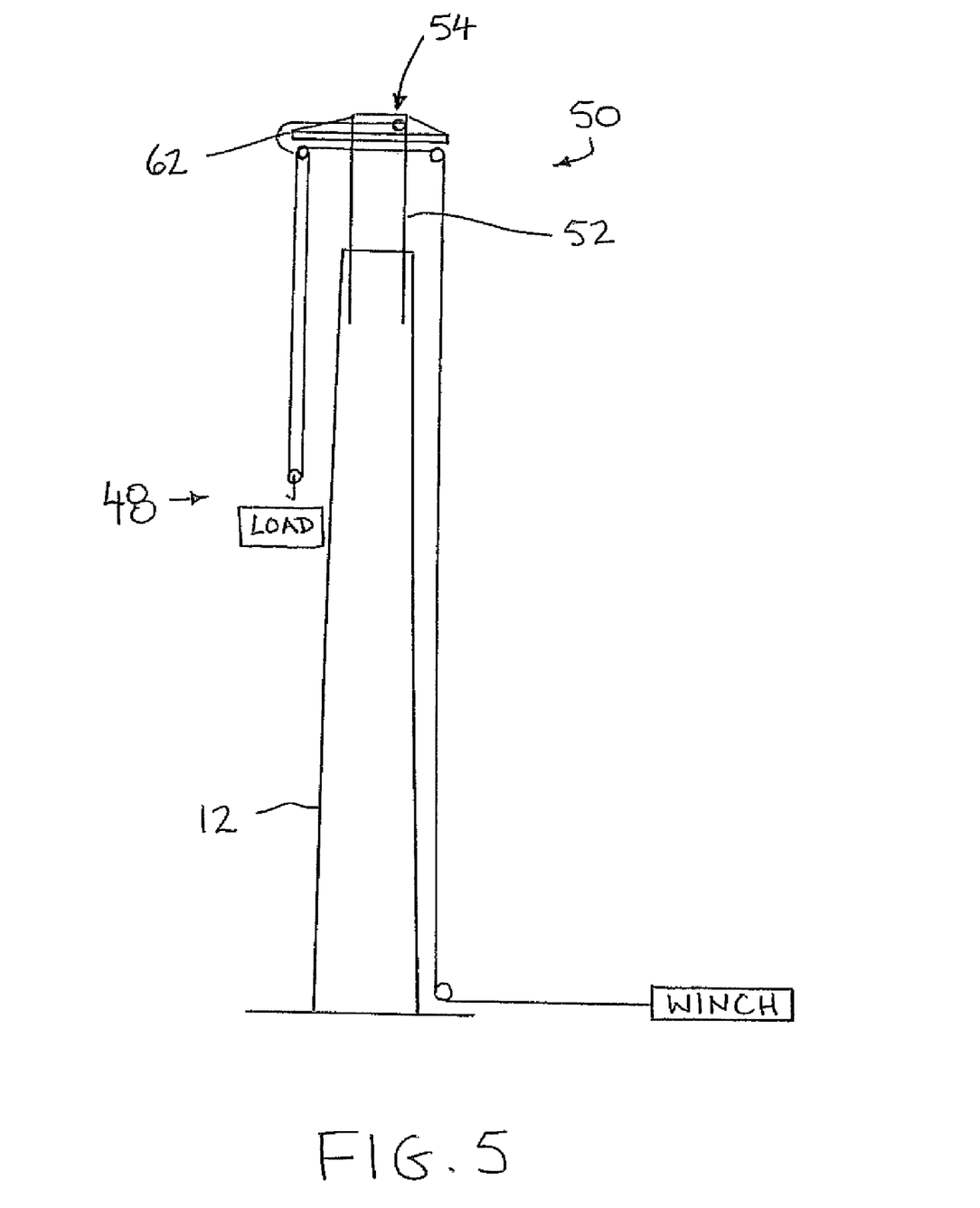
FIG. 5 is a side elevational view of the tower and the primary lifting device supported thereon.

When the tower is erected to its desired height, the remaining parts of the turbine are lifted onto the top end of the tower using a primary lifting device 48 supported by a gantry 50 which is carried to the top of the tower together with the slip form during the formation of the concrete tower. The gantry 50 is initially assembled and supported on the slip form when the slip form is first assembled at ground level on the foundation. The primary lifting device supported on the gantry can be used for lifting concrete and reinforcing bars onto the deck for placement into the form during the forming of the various wall portions of the concrete tower.

The gantry 50 generally comprises two upright frame assemblies 52 which are supported parallel and spaced apart from one another on opposing sides of the concrete tower being formed. The upright frame assemblies 52 are spaced apart in a lateral direction by a suitable space to accommodate the size of the nacelle to be lifted into place and received therebetween during the assembly stage of the turbine parts above the tower. The gantry 50 further comprises an overhead frame assembly 54 which is connected between the top ends of the two upright frame assemblies such that the overhead frame assembly spans in the lateral direction between the two upright frame assemblies 52 to form a generally U-shaped configuration therewith. The overhead frame assembly 54 is supported spaced above the top end of the tower by the two upright frame assemblies by a sufficient space to accommodate the nacelle and the transition member on the top end of the tower below the overhead frame assembly.

Each of the two upright frame assemblies 52 comprises a generally planar frame structure comprised of two columns 56 which are spaced apart in a longitudinal direction oriented perpendicular to the lateral direction to extend vertically the full height of the frame assemblies 52. The two columns of each upright frame assembly 52 are joined by a plurality of interconnecting frame members 58 extending generally in the longitudinal direction between the columns.

The overhead frame assembly 54 comprises two support beams 60 which span in the lateral direction between the two upright frame assemblies 52 at opposing sides of the tower. The two support beams 60 are spaced apart in the longitudinal direction and are joined by a main beam 62 spanning in the longitudinal direction therebetween. The main beam 62 protrudes outwardly at forward and rearward ends in the longitudinal direction beyond the ends of the upright frame assemblies 52 and beyond the diameter of the concrete tower therebelow for suspending the primary lifting device therefrom. The primary lifting device is moveable in the longitudinal direction along the length of the main beam to assist in positioning the various components of the turbine relative to the concrete tower. The primary lifting device generally comprises a plurality of pulleys and a suitable cable which communicates between a winch at one end which may be supported on the concrete tower or at the foundation on the ground at one end and a suitable load block for lifting at the other end.

The two upright frame assemblies 52 are initially supported on the structure of the slip form during formation of the concrete tower. Once the formation of the concrete tower is complete, the gantry is transferred onto the tower for anchoring to the external side of the tower at circumferentially spaced positions thereon spaced below the top end of the tower. Suitable transfer members 64 are provided in which each member spans downwardly and inwardly from a respective one of the columns 56 of the upright frame assemblies to a respective anchor on the exterior of the tower spaced below the platforms suspended from the slip form. Auxiliary frame members 66 may also be provided interconnected horizontally between the bottom ends of the columns 56 of the upright frame assemblies and the top end of the concrete tower. Once the gantry is anchored relative to the concrete tower, the inner and outer decks can also be transferred onto the concrete tower such that the inner and outer form assemblies can be removed together with the yoke members of the slip form structure. The scaffolds can be lowered relative to the slip form prior to anchoring to the concrete tower and subsequent removal of the slip form structure.

Figure 6:
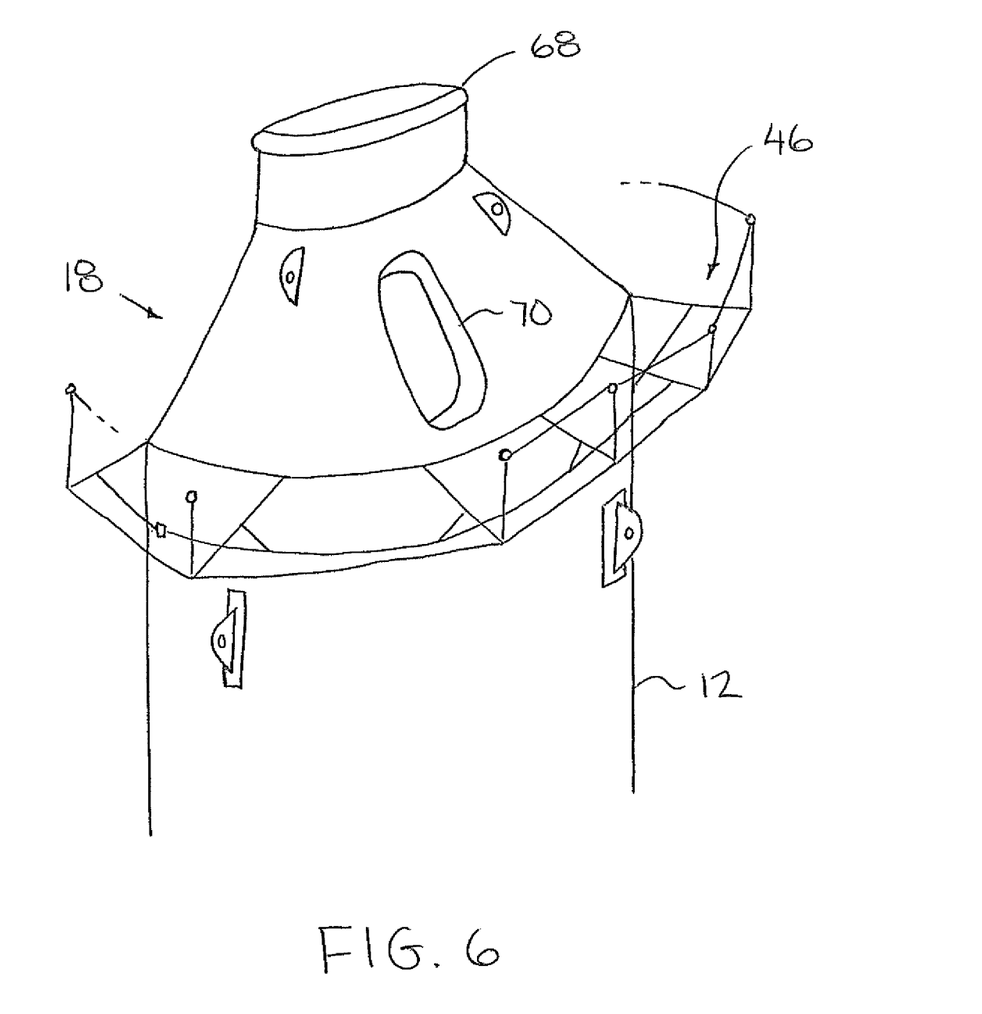
FIG. 6 is a perspective view of a transition member supported on the top end of the tower.
Figure 7:
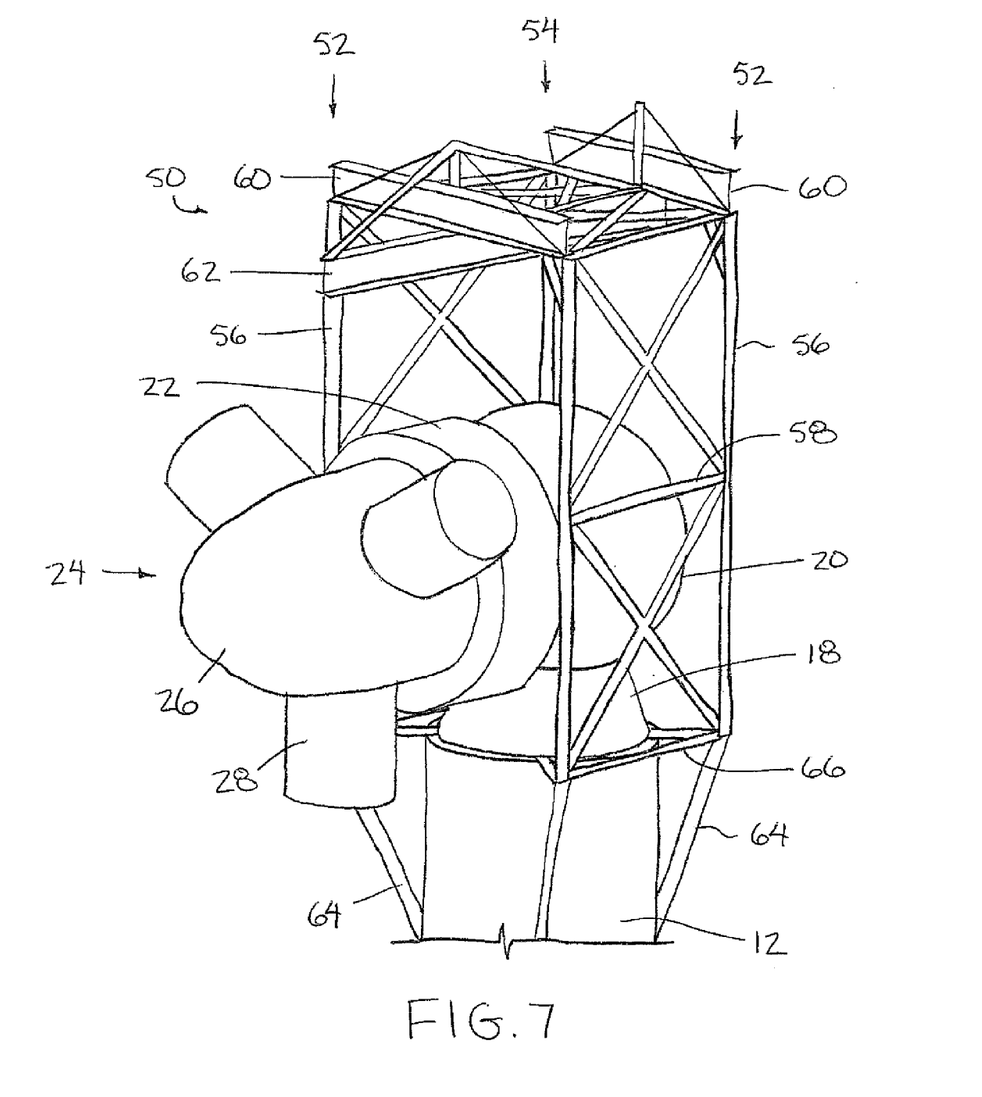
FIG. 7, FIG. 8 and, FIG. 9 are perspective, front elevational, and side elevational views of the rotor, generator and nacelle after being lifted onto the transition member by the primary lifting device of the gantry.
Figure 8:
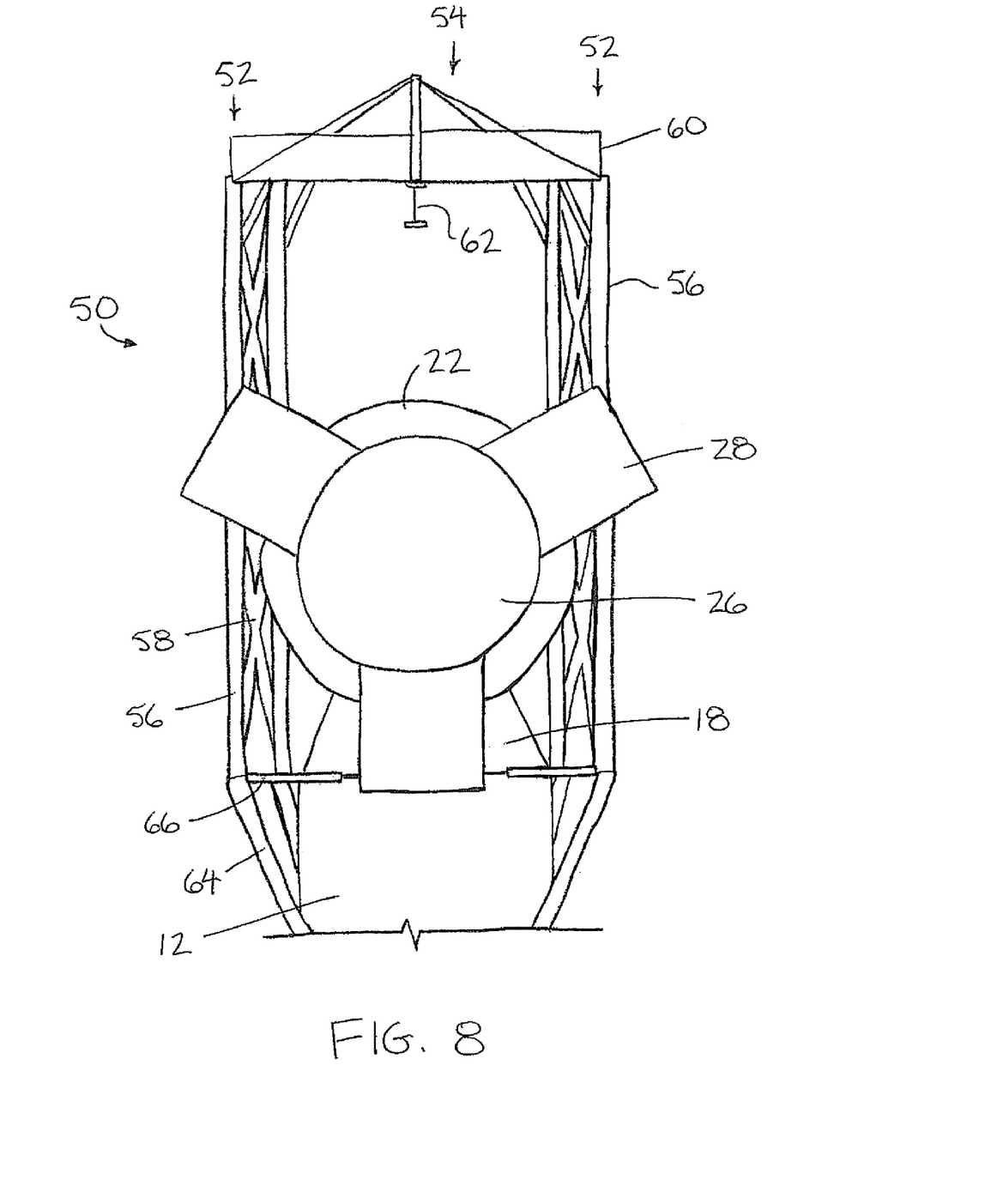
Figure 9:
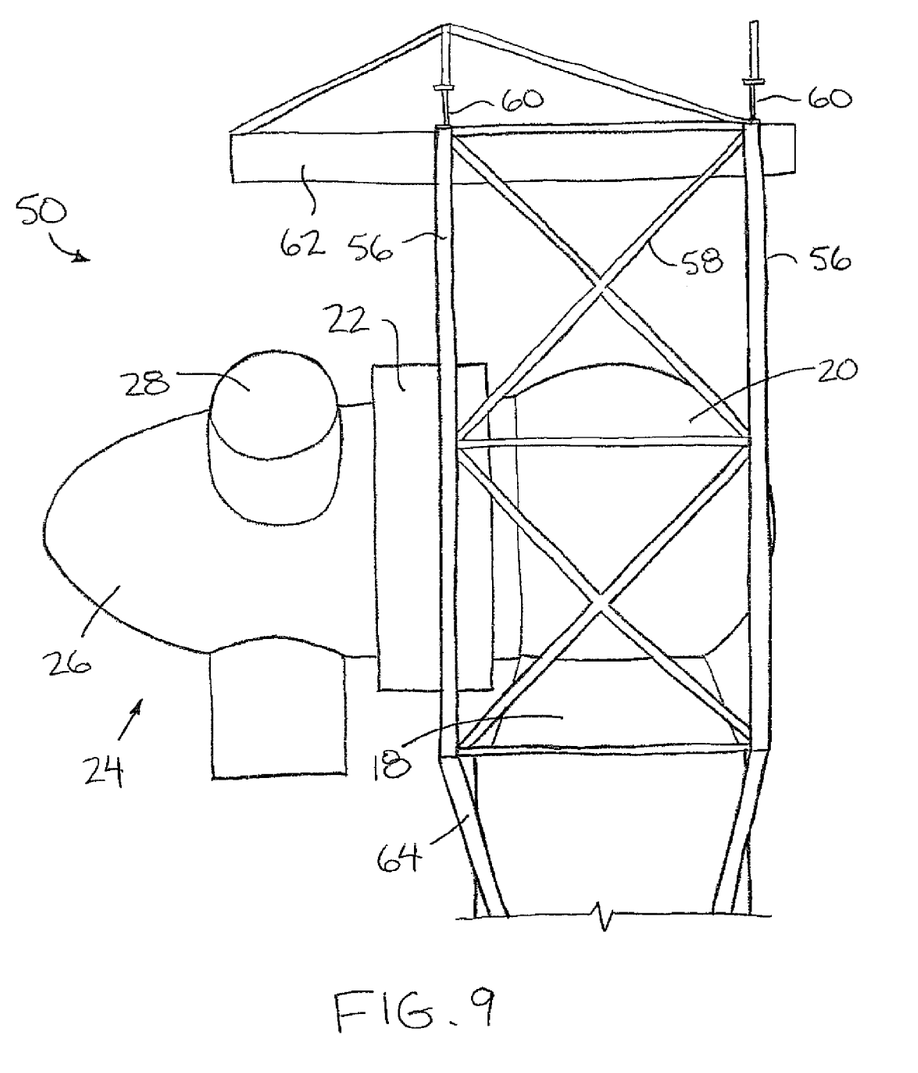

Once the components of the slip form anchored at the top end of the concrete tower are removed, the transition member can be lifted by the primary lifting device into position at the top end of the tower. Lifting involves positioning the load block to be suspended from one end of the main beam outwardly beyond the circumference of the tower to lift the transition member alongside the tower at the exterior side thereof until the transition member reaches the height of the top end of the tower. The primary lifting device is then displaced along the main beam to align the transition member relative to the tower at which point the transition member is deposited onto the top end of the tower.

Suitable anchorages are provided at the top end of the tower in connection with the transition member and the foundation for connecting tendons between the anchorages which can placed under tension to pre-stress the concrete under compression prior to the installation of the subsequent components of the turbine. Once the transition member is installed, the inner and outer decks and the scaffolds thereof can be anchored to the transition member for optimal access of workers to the continued assembly of the turbine. By anchoring the gantry to the exterior of the tower spaced below the top end of the tower, the gantry is effectively anchored to the tower at a location spaced below the installation of the transition member on the tower.

The transition member 18 is a hollow member having an annular perimeter wall which is generally frusto-conical in shape so as to taper upwardly and inwardly from an annular base having a diameter close to the top end of the tower upon which it is supported to a top end defining an annular mounting flange 68 which is arranged to rotatably support the nacelle thereon for relative pivotal movement about a vertical pivot axis.

The rigid metal wall forming the transition member includes a plurality of access openings 70 formed at circumferentially spaced positions. Suitable doors are provided to selectively enclose the access openings when not in use. The transition member further comprises a plurality of anchor points on the interior and exterior sides thereof for supporting various secondary lifting equipment and for suspending the scaffolds or platforms of the inner and outer decks thereon.

A secondary lifting device 72 is supported at the top end of the tower for use in cooperation with the various secondary lifting components supported within the hollow interior of the transition member and at the exterior thereof for manipulating the gantry and other components of the forms during relocation or disassembly thereof. Prior to disassembly, the primary lifting device on the gantry is used to lift the nacelle, the generator and the rotor into position on a top end of the concrete tower.

Figure 10:
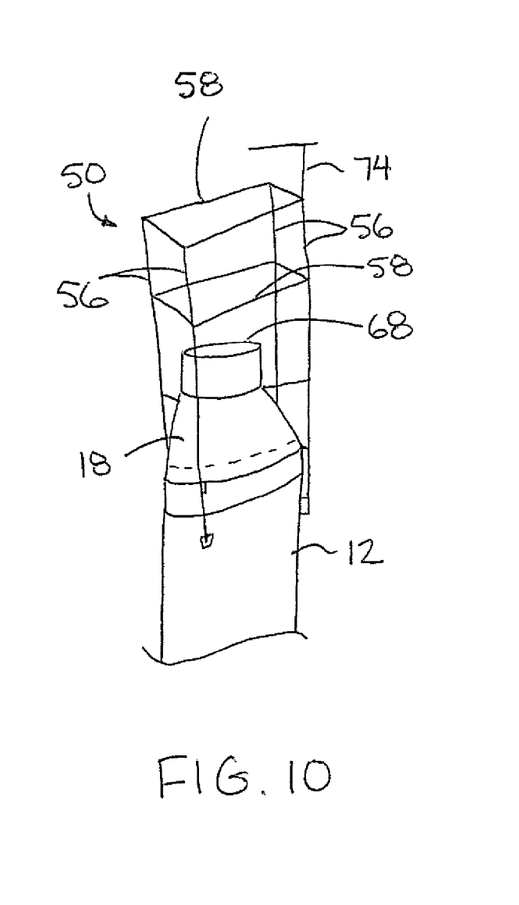
FIG. 10 is a schematic representation of a secondary lifting device for removing the gantry.

The secondary lifting device 72 typically comprises a jib 74 comprising a vertical post and pulleys and the like supported at the top end thereof to extend over top of the gantry. The jib can be supported externally of the transition member and is accessible by a suitable winch of the secondary lifting device through the access openings in the transition member.

Figure 11:
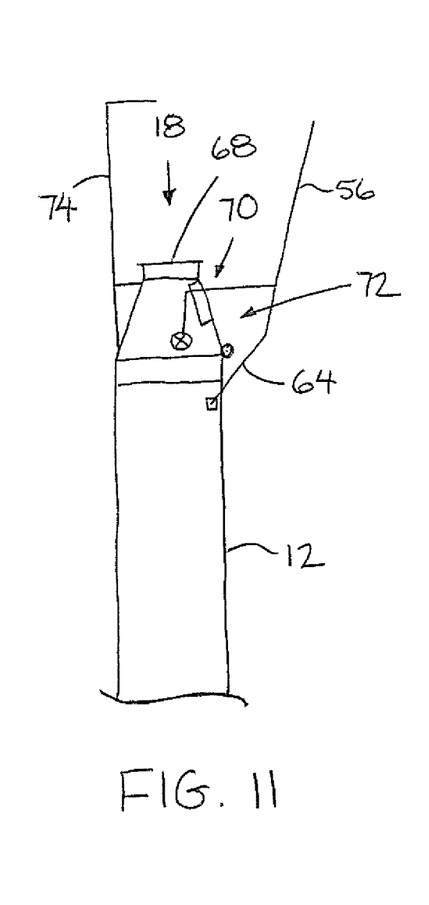
FIG. 11 is a schematic representation of the gantry shown partially disassembled.
Figure 12:
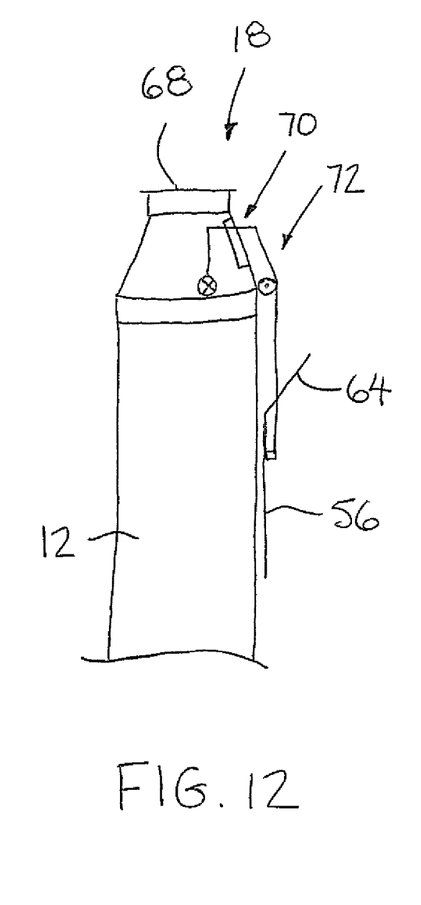
FIG. 12 is a schematic representation of the secondary lifting device lowering a final portion of the gantry to the ground.

The secondary lifting device 72 along with the jib 74 thereof are used to disassemble the gantry by first removing the main beam, followed by the support beams of the overhead frame. The upright frame assemblies at opposing sides of the gantry are then disassembled by first removing the frame members thereof until the columns of the side frames are separated from one another. Each of the columns 56 is hinged at the bottom end thereof to the respective anchor on the external side of the tower so that the top ends of the columns can be pivoted downwardly and radially outward into a lowered position suspended downwardly from the respective anchor. The columns are controllably lowered by the secondary lifting device 72 into the inverted position suspended from the anchor and are subsequently lowered to the ground one at a time by using various guides of the secondary lifting device supported on the transition member as shown in FIGS. 11 and 12.

Once all of the components of the gantry have been removed, the components of the inner deck which are no longer required, including the scaffold suspended therefrom, can be also lowered to the ground using the secondary lifting device. The external scaffold can be lowered prior to disassembly of the gantry so as not to interfere with the lowering of the various gantry components. Once the gantry is disassembled and lowered, the construction of the turbine is effectively completed. The gantry, the scaffolds and the lifting devices can all be reused for erecting subsequent wind turbines of like configuration.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of erecting a wind turbine comprising a concrete tower supporting a nacelle, a generator and a rotor thereon, the method comprising:
    forming a foundation;
    assembling a slip form comprising an inner form assembly and an outer form assembly defining an annular casting space therebetween having an open bottom end;
    supporting the slip form on the foundation;
    supporting a gantry comprising a primary lifting device above the slip form;
    pouring concrete into the casting space in the slip form to define a first wall portion of the concrete tower;
    raising the slip form together with the gantry relative to the first wall portion;
    pouring concrete into the casting space in the slip form to define a plurality of subsequent wall portions;
    raising the slip form together with the gantry relative to a previously formed one of the wall portions after concrete is poured into each of the plurality of subsequent wall portions until the concrete tower is formed;
    transferring the gantry from the slip form to the concrete tower;
    lifting the nacelle onto the concrete tower using the primary lifting device;
    lifting the generator onto the concrete tower using the primary lifting device and attaching the generator to the nacelle;
    lifting the rotor onto the concrete tower using the primary lifting device and attaching the rotor to the generator;
    supporting a secondary lifting device on the concrete tower;
    lowering the gantry and the primary lifting device to the foundation using the secondary lifting device.

2. The method according to claim 1 including lifting a transition member onto the concrete tower using the primary lifting device and supporting the nacelle on the transition member.

3. The method according to claim 2 including supporting the transition member on a top end of the concrete tower above an anchoring position of the gantry on the concrete tower.

4. The method according to claim 2 wherein the transition member comprises a frustoconical member which is reduced in diameter from an annular bottom end supported on a top end of the concrete tower to a top end supporting the nacelle thereon.

5. The method according to claim 2 including providing an annular flange about a top end of the transition member and supporting the nacelle on the annular flange for rotation relative to the concrete tower about a vertical pivot axis.

6. The method according to claim 2 including lowering the inner form and the outer form relative to the concrete tower prior to lifting the transition member onto the concrete tower.

7. The method according to claim 2 including tensioning a plurality of tendons between the foundation and the transition member such that the concrete tower is under compression.

8. The method according to claim 2 including tensioning the plurality of tendons prior to lifting the nacelle and the rotor onto the concrete tower.

9. The method according to claim 2 wherein the transition member comprises a perimeter wall surrounding a hollow interior and wherein the method includes providing an access opening in the perimeter wall, anchoring the secondary lifting device within the hollow interior of the transition member, and lowering the gantry and the primary lifting device using the secondary lifting device by communicating the secondary lifting device through the access opening in the transition member.

10. The method according to claim 1 including forming the gantry to comprise a pair of upright frame assemblies on opposing sides of the concrete tower so as to receive the nacelle therebetween and an overhead frame assembly spanning between the pair of upright frame assemblies spaced above the concrete tower so as to receive the nacelle therebelow, the primary lifting device being suspended from the overhead frame assembly.

11. The method according to claim 10 including orienting the overhead frame assembly to span in a lateral direction between the two upright frame assemblies and providing a main beam on the overhead frame assembly which spans generally horizontally in a longitudinal direction perpendicular to the lateral direction, the primary lifting device being movable in the longitudinal direction along the main beam of the overhead frame assembly.

12. The method according to claim 11 including anchoring each upright frame assembly externally on the concrete tower at a bottom end of the upright frame assembly.

13. The method according to claim 10 including disassembling the frame assemblies of the gantry prior to lowering the gantry to the foundation.

14. The method according to claim 13 including lowering the main beam and the overhead frame assembly to the foundation prior to disassembling the upright frame assemblies.

15. The method according to claim 1 including supporting an inner deck spanning generally horizontally across the inner form assembly.

16. The method according to claim 15 including transferring the inner deck from the slip form to the concrete tower and lowering the slip form to the foundation after the inner deck is supported on the concrete tower.

17. The method according to claim 15 including partially lowering the inner deck prior to transferring the inner deck onto the concrete tower.

18. The method according to claim 1 including supporting an outer deck spanning generally horizontally about the outer form assembly.

19. The method according to claim 18 including transferring the outer deck from the slip form to the concrete tower and lowering the slip form to the foundation after the outer deck is supported on the concrete tower.

20. The method according to claim 18 including lowering the outer deck to the foundation using the secondary lifting device after the nacelle and the rotor are supported on the concrete tower.

* * * * *